Aug. 28, 1962  H. WALD  3,051,899
REMOTE METERING OF ELECTRIC ENERGY WITH CURRENT TRANSFORMER
Filed Oct. 23, 1958  2 Sheets-Sheet 1

*INVENTOR.*
BY Herman Wald

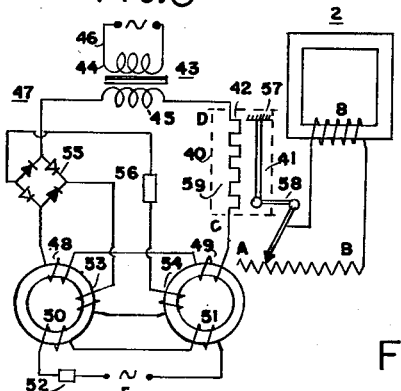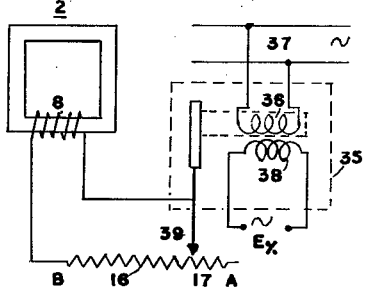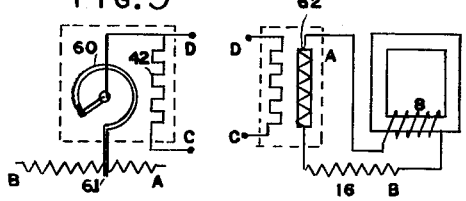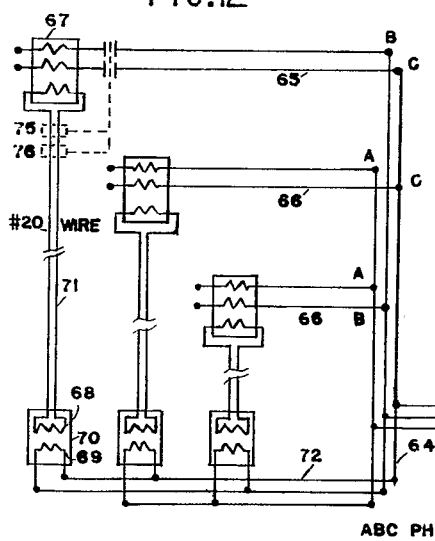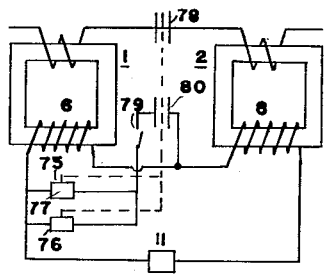

United States Patent Office 3,051,899
Patented Aug. 28, 1962

3,051,899
REMOTE METERING OF ELECTRIC ENERGY
WITH CURRENT TRANSFORMER
Herman Wald, 23—31 29th St., Astoria, N.Y.
Filed Oct. 23, 1958, Ser. No. 769,178
3 Claims. (Cl. 324—127)

This invention is related to an improved and simplified method of remote metering of kilowatthours consumption by means of current transformer.

More specifically stated, this invention relates to improvements in the accuracy characteristics of such current transformers, preferably by means of an auxiliary core as being particularly required for remote metering due to the unusual long run of the secondary leads greatly affecting the accuracy of such current transformers when operating under very high secondary burden.

Since the current transformer is used to step the current in primary circuits down to values suitable for direct connection to measuring instruments for indicating the value of the current flowing in the primary circuit, it is highly important to maintain a consistent ratio of primary to secondary current as the line current changes. In a perfect current transformer the primary and secondary ampere-turns would be exactly equal in magnitude and precisely in phase opposition for all conditions of operation and secondary load.

In current transformers, however, the primary and secondary currents are generally not in phase with each other and also the ratio of the magnitude of the two currents may vary as the line current or secondary burden changes. This is due to the fact that a voltage must be induced in the secondary winding to overcome the impedance of the secondary load circuit, therefore it gives rise to a corresponding magnetic flux in the core and it is the ampere-turns needed to maintain the flux which constitute the error in current transformers. This is actually a result of the non-linear shape of the core loss and magnetization curves, whereby the variation of the exciting current is not proportional to the flux density as it requires a component of the primary current to supply the losses affecting appreciably the accuracy of the operation.

The inaccuracy of current transformers is more serious in remote metering having considerably extended secondary wiring imposing a high secondary burden, the value of which varies in each case with the length of the secondary wiring connections leading to the remotely located metering equipment.

It is generally known that an increase in the total impedance of the secondary burden, including external burden of meter and secondary leads, requires a corresponding increase of the induced secondary voltage if a given ratio or secondary current is to be maintained and this increased voltage necessitates a proportionate increase of the main flux and following exciting current. Because of this, the accuracy of the meter is even more greatly affected since the flux must be sufficiently increased to induce a voltage in the secondary winding which will overcome the voltage drop through the total overall burden. In general, an increased burden tends to raise the ratio and phase angle error, and moreover for burdens above the nominal volt-ampere rating the errors usually increase very rapidly and may become excessively high as will be shown hereinafter.

The normal rated secondary current for current transformers is generally adopted to be five amperes. However, in remote metering there would be a distinct advantage to reduce the rating to approximately one ampere, thereby greatly diminishing the power wasted in the leads and to enable transformers of lower rated output to be used with an accuracy adequate for metering purposes.

This is a very difficult task to achieve since the current transformers have to work over a very wide range of line current and the magnetizing and iron-loss ampere-turns vary in a most complicated manner as the primary current changes. Consequently it may be advantageous to correct for one particular condition, and it may fail to work accurately for another set of conditions.

In prior art structures several arrangements have been proposed and used for improving the accuracy of current transformers. Some of them produce accurate results only by operating the transformer on a definite load and a new adjustment is necessary for an appreciable change in the secondary load. Some two-stage transformers have satisfactory ratio and phase angle error compensation for moderate changes in current and burden, however, where it is important to obtain high accuracy on various large burdens or large variation of line current, they fail to operate with acceptable accuracy.

By way of example, an important application of a more accurate current transformer operating on large burdens in remote metering would be for individual metering installations in multistory buildings where the required feeder-wiring of considerable length, leading to the meters located in the basement, greatly increases the cost of installation and also produces an appreciable voltage drop requiring a further increase of feeder capacity to compensate for this loss.

The general object of the invention, therefore, contemplates the provision of means associated with the conventional current transformer to provide an automatic ratio and phase angle correction to compensate for the effect of the increased secondary burden produced by the unusual long secondary leads and thereby to make possible accurate measurements irrespective of the varying secondary burden.

In accordance with the invention this object is accomplished by supplying the total necessary voltage to the total secondary burden by means of an auxiliary compensating core supplying the required flux, whereby the main core flux becomes zero and the current transformer will actually operate with neither ratio or phase angle error and will merely perform its task to measure the current with a predetermined constant ratio.

A further object of the invention is to provide an automatic compensating means for the line drop through the whole secondary wiring or load by inserting the full voltage required by this line drop in series with the secondary circuit by means of additional voltage transformers.

A further object of the invention is that the relay means controlling the automatic compensation of the required secondary voltage in accordance with the control error voltage is represented by a magnetic amplifier means.

A still further object of the invention is to replace the relay means by a sensitive relay system of the electro-dynamometer type which also serves as phase sensitive detector.

Another object of the invention is to substitute a thermal control unit for the said relay control means operating in conjunction with a magnetic amplifier means by using a bimetallic temperature responsive element or thermal responsive resistor with positive temperature coefficient.

Another object of the invention is to replace the said relay control means by a magnetic amplifier means, where the shunting reactance of the saturable core device controls the compensating voltage in accordance with the variation of the error voltage impressed upon its input terminals.

A further more important object of the invention is to use the novel current transforming system for measuring the kilowatthours in applications where the meters are located at a considerable distance from the load in using only control wiring of negligible capacity imposing a high burden upon the transformer.

A final object of the invention is to provide protective devices to automatically interrupt the current supply through the current transformer in case of short circuit or opening of the secondary metering circuit for preventing the usage of current when meter operation is stopped.

Further objects of the invention lie in the combination of various above-mentioned arrangements to form various complete remote metering systems and also include the various combinations and subcombinations of elements and their inter-relation.

The objects of the invention will be evident from the detailed description in conjunction with the accompanying drawings and for fuller understanding reference will be made to them, in which:

FIGURE 7 illustrates another modification of the relay means which is replaced by an electrodynamometer type of relay system controlling the automatic compensation.

FIGURE 8 represents another important modified arrangement of the relay control means wherein a magnetic amplifier means in conjunction with a thermal control unit having a bimetallic element controlling the automatic compensation.

FIGURE 9 shows only a modification of the embodiment represented in FIGURE 8.

FIGURE 10 represents also a modified arrangement of the embodiment illustrated in FIGURE 8 where the bimetallic element is replaced by a thermal responsive resistor of positive temperature characteristic.

FIGURE 11 shows another modified arrangement of the relay control means wherein a magnetic amplifier means performing the control of the compensating voltage in accordance with the variation of the error voltage impressed upon its input terminals.

FIGURE 12 represents an illustrative example for the application of the compensated current transforming system to remote metering where secondary wiring of negligible capacity is used for connecting the current transformer to the remotely located measuring apparatus.

FIGURE 12a is a diagrammatic view of protective devices applied to the remote metering systems to be actuated under abnormal operating conditions for preventing the usage of current when meter operation is stopped.

Figure 1:
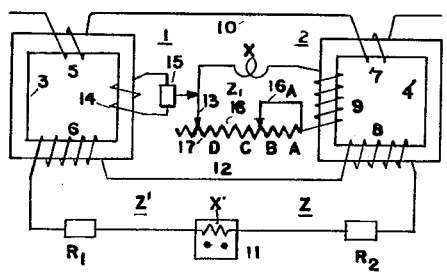
FIGURE 1 is a diagrammatic view of the automatically compensated current transformer with its auxiliary transformer and self-control arrangement representing the basic principle of the invention.

Referring particularly to FIGURE 1, there is a diagrammatic illustration of the basic principle of the invention showing the main characteristic feature of supplying the necessary full secondary voltage to the secondary burden by an auxiliary automatic control device.

The desired full compensation is preferably obtained by the use of two distinct current transformers 1 and 2, respectively operating by the same primary current including two magnetic cores where the reference character 3 designates the main core and 4 denotes the auxiliary compensating core. The main core 3 has the primary winding 5 and the secondary winding 6, whereas the core 4 has the primary winding 7 and secondary winding 8. It is not definitely necessary that the primary to secondary turn-ratio should be the same on both cores. The auxiliary core 4 has another compensating winding 9 and it is particularly important that the windings 8 and 9 on the auxiliary core shall have exactly the same number of turns to be selected arbitrarily. It will be seen that the two primaries 5 and 7 are connected in series through conductor 10 and so are also the two secondaries 6 and 8 in series through the instrument 11 shown at a wattmeter being interconnected by the extended secondary wiring 12 which then constitutes the main secondary burden $Z'$ or total impedance on the main transformer 1.

The compensating winding 9, however, is closed by a compensating impedance $Z_1$ consisting of a series combination of an equivalent reactance and ohmic resistance of the main burden and it is also equipped with a slider 13 to vary the ohmic resistance to any desired value as required for a perfect compensation to be explained hereinafter.

The main core 3 has also a tertiary winding 14 to be called "control winding" being connected to a voltage sensitive relay 15 of the conventional type to control the position of the slider to establish the desired balanced condition. The number of turns of winding 14 can be selected any value favorable to the characteristics of the relay 15 as its operation is independent of the primary to secondary turn-ratio of the current transformer 1. The voltage sensitive relay arrangement is well known and therefore no further details are given.

The principles and operation of this system may be understood as follows:

The normal rated burden of the current transformer 1 is VA volt-amperes at certain rated secondary current $I_s$ and power factor cos $\phi'$. Then the total impedance $Z'$ of the burden is determined by the formula: $VA = I_s^2 Z'$, and the corresponding resistance and reactance of the secondary burden are found from:

$$R_1 = Z' \cos \phi', \text{ and } X = Z' \sin \phi'$$

we assume that under normal burden with short secondary leads the actual burden is given by the above values where X denotes the total reactance of the metering device including secondary winding and $R_1$ is the total resistance including secondary leads. Thus $Z'$ may define the total lumped impedance of the secondary circuit including the auxiliary winding. It is to be noted that the auxiliary winding 8 does not represent any choke to the secondary current flow because of the closed compensating winding 9 wound on the same auxiliary core 4.

If now a long secondary wiring with the resistance $R_2$ leading to the remotely located meter is joined in series, the total impedance of the secondary burden has increased to the value:

$$Z = \sqrt{X^2 + (R_1^2 + R_2^2)^2} \qquad (1)$$

and with its power factor cos $\phi_s = (R_1 + R_2)/Z$.

Figure 2:
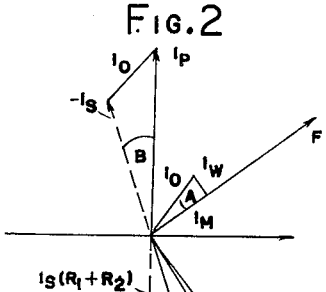
FIGURE 2 is a vector diagram of the current and voltages acting in the current transformer operating with the conventional ratio and phase angle error.

FIGURE 2 is a vector diagram illustrating the conditions of an uncompensated transformer operating with appreciable errors due to the high secondary burden. At right angles to the flux F is the induced voltage vector $E_2$ and the secondary terminal voltage $E_s$ is displaced in phase due to the voltage drop on the impedance of the secondary windings. The secondary current $I_s$ generally lags behind the terminal voltage $E_s$ by some angle $\phi_s$ and this voltage $E_s$ is always consumed in sending the current $I_s$ through the total impedance of the burden consisting of the drops $I_s(R_1+R_2)$ and $I_sX$.

The primary current $I_p$ is shown as a vector sum of the secondary current vector $I_s$ reversed and the exciting current $I_o$ drawn by the main transformer 1, and the reversed $I_s$ leads the primary current $I_p$ by the phase angle B. The ideal condition would be that this phase angle becomes zero with zero ratio error, in which case the current $I_p$ and secondary current $I_s$ shall be 180° apart in time phase relation. It is clear that the phase position and magnitude of the exciting current $I_o$ depends mainly on the ampereturns needed to maintain a flux required to induce the secondary voltage to circulate the load current $I_s$ through the impedance of total burden.

In accordance with the principle of the invention the necessary condition to achieve a full compensation over a wide range of primary current and secondary burden is to supply to the main core 3 the total required secondary voltage in magnitude and phase by automatically matching the auxiliary compensator impedance $Z_1$ with $\underline{Z}$ of the whole secondary circuit in any time-moment and under varying operating conditions. We assume that with a given lumped secondary burden $\underline{Z}$, the voltage V is required to drive the rated secondary current of A amperes through the whole burden. Should the adjustable compensating impedance $Z_1$ be set to zero, there will be no voltage induced in the compensating winding 9 of the auxiliary core 3, since the compensating flux is zero and the necessary full voltage is induced solely by the main transformer 1, consequently it will operate with the usual errors as discussed heretobefore. If now the compensating impedance $Z_1$ is gradually increased to the equivalent value $\underline{Z}$, an identical voltage V will be induced in winding 9 to force through the same current A. Due to the fact that the auxiliary core flux becomes also transferred to winding 8, and since they have the same number of turns, an identical voltage will also develop across the winding 8. Thus the full voltage V becomes inserted in series with the secondary circuit, which is able to overcome the required voltage drop on the total secondary burden $\underline{Z}$, whereby the actual fluz in the main core 3 reduces to zero since all the necessary energy is supplied by the auxiliary core 4 and therefore the main transformer 1 will operate with neither ratio nor phase angle error. For an exact setting of the adjustable compensating impedance $Z_1$ an equilibrium may be reached, because with lower or higher settings an under or over-compensation may actually occur, as explained hereinafter on vector diagram of FIGURE 3.

At first sight it would appear that by adjusting the compensating impedance $Z_1$ to become identical to the secondary impedance $\underline{Z}$, the full voltage is produced by the auxiliary core 4 and flux in the main core 3 reduces to zero. However, the compensating transformer has also errors of its own being particularly due to the relatively high compensating voltages required by the high burden, and also with due consideration of the changes in the line current, a certain flux still would appear on the main core 3. Therefore, the arrangement of FIGURE 1 also makes provision for an automatic control of the self-adjustment of the compensating impedance $Z_1$ to produce any time-moment a correspondingly increased voltage to make up for the appreciable losses in the compensator core 4, whereby a perfect accuracy of the main transformer is reached under any variation of the line current or burden.

This automatic compensating method has particular importance in remote-metering applications. Due to the considerably long run of wiring, the increase of impedance is rather in the ohmic resistance since the secondary leads can be made twisted and thereby to reduce the change in the reactance to a negligibly small amount. In the actual practice of remote metering, therefore, a considerable part of the secondary is the ohmic resistance, whereas the instrument reactance has only a relatively minor effect on the total impedance.

In view of the preceding considerations this invention contemplates the attainment of an exceedingly wide range of very sensitive control of the compensating impedance $Z_1$ with a minimization of the power requirements which are significant from the point of view of actual circuit efficiency, particularly in self-regulated circuits. Of course, the method herein employed provides the desired automatic control without sacrifice of any of the advantages inherent in the use of a variable resistor actuated by contactors or sliders. This is accomplished by utilizing a plurality of resistance segments in series to be short circuited or progressively rendered effective by the adjusting slider 13, the position of which actually determines the portion of the resistance of the compensating impedance $Z_1$ being included in the circuit of the compensating winding 9. The slider 13 may initially be set such as to make the effective resistance segments to approximately correspond to the resistance of the secondary wiring-length used on a particular application. Since each individual resistance segment may have an effective resistance range which is but a small portion of the total expectable range of resistance variation required, the actual displacement of the compensating slider may be restricted to maximum within the limits of one single resistance segment.

The compensating impedance assembly $Z_1$ according to the invention shown on FIGURE 1 preferably comprises tapped fixed resistor elements, A, B, C, D, associated with a switching means $16_A$ adaptable to short circuit or render inoperative any element to suit the particular compensating requirements, and thereby to vary the so called distance-range of the remote metering system. The last resistance segment, however, is preferably selected to be of the potentiometer type with sensitive regulating characteristics denoted by the reference numeral 17, and shall have a variable range to automatically control the necessary compensating voltages. The position of the slider 13 on the potentiometer resistance 17 is at any time-moment representative of the control-voltage required to be induced into the secondary circuit for establishing the zero-flux condition in the main core 3.

The operation of the automatic compensation may be described as follows:

As previously explained, the basic duty of this automatic compensation is to maintain a zero flux in the main core 3 under varying conditions of load or line current. It may be well appreciated that if under a given secondary load current and a definite adjusted setting of the slider 13 on the impedance $Z_1$ the produced voltage on winding 9 of the auxiliary core 4 injected into the secondary circuit happens to be exactly correct in magnitude and phase, the ampere-turns of the main core's two windings 5 and 6, will cancel each other as the entire volt-amperes required by the burden is correctly delivered, thus no resultant magnetization in this core is produced. As a result of the zero-flux condition, no voltage will appear across the terminals of the tertiary control winding 14, therefore no voltage is applied on the control terminals of the voltage-sensitive relay coil 15 of any conventional type which in turn will not effect any movement on the slider 13. The operation of such control relay or any different type of auxiliary control means to actuate the slider in strict correspondence with the control voltage will be described later on in a more detailed manner as various modified arrangements of the control means.

If, however, as is particularly the case in remote metering with variable burden, the secondary current produced by the main transformer 1 may appreciably deviate from the desired accurate value in magnitude and phase, a resultant magnetic flux builds up in the core 3 inducing a corresponding voltage in the control winding 14 to control the necessary adjustment of the slider to restore the equilibrium of the system with zero flux by supplying the exact secondary voltage as required for the volt-amperes of the burden to circulate the current therethrough. In this manner the system is self-balancing by automatically adjusting the produced secondary voltage to maintain constantly the zero-flux condition in the core 3, whereby a perfect accuracy of operation is achieved.

It is important to note that the relatively high second order errors introduced by the comparatively great losses in the compensator core 4 caused by the induction of the full secondary voltages, are also compensated by the automatic setting of the adjusting slider controlled solely by the flux appearing in the main core 3 driving the slider toward a self-balanced position until the flux disappears. It is to be understood that this self-balance could possibly be obtained only with increased voltages in order to provide compensation also for its own losses.

Figure 3:
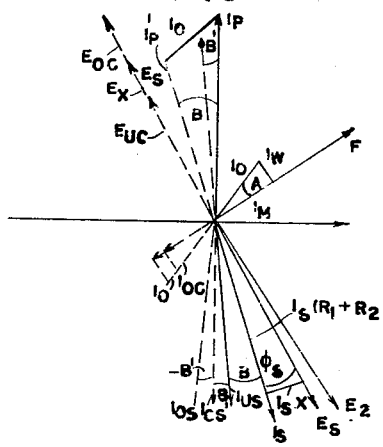
FIGURE 3 shows the vector diagram of the compensated current transforming system operating with balanced ampere-turns in accordance with the principles of the invention in supplying the required compensating voltage to the secondary load circuit by an auxiliary current transformer.
Figure 4:
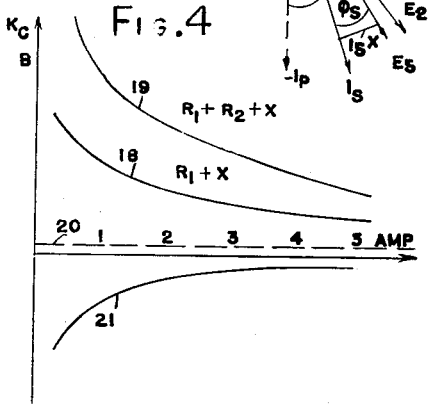
FIGURE 4 represents a series of error curves illustrating the characteristics of the compensated and uncompensated current transformer.

The vector diagram of FIGURE 3 and accompanying error curves shown on FIGURE 4 may serve as further clarification of the self-balancing operation.

It may be appreciated that, theoretically, we may distinguish between the following conditions of operation:

*(a) Undercompensated Case*

In this case the voltage $E_{uc}$ produced by the compensator 9 of the auxiliary core 4 and injected into the secondary circuit is insufficient to circulate the rated secondary current through the total secondary burden.

This condition may be expressed by:

$$E_2 = E_{uc} + E_x \quad (2)$$

where $E_2$ denotes the required total secondary voltage, and $E_x$ is the voltage contributed by the main transformer 1. This equality is based on the fact that at any time moment the sum of the secondary electromotive forces in the windings 6 and 8 in series must be constant and equal to the required $E_2$ voltage and therefore the main transformer will adjust itself to supply automatically the balance voltage $E_x$. The above mentioned balancing vector-voltages are represented on vector diagram of FIGURE 3 with inverse phase-relationship.

Among the reasons of such an uncompensated operating condition may be cited such as, incorrect setting of the compensating adjuster, variation of line current, secondary burden, etc. This condition is also shown by the uncompensated error curves of FIGURE 4 for different secondary burden and current, the characteristics of which will be described hereinafter.

As previously explained, the primary current must contain a component opposite in phase to $I_s$ and of such magnitude that the secondary and primary load ampere-turns are equal. If $I_p'$ is this component, $T_p$ and $T_s$ are the numbers of primary and secondary turns respectively, then:

$$I_p' = (T_s/T_p) I_s = K_t I_s \quad (3)$$

where $K_t$ is the ratio of secondary to primary turns. The total exciting current $I_o$ is the vector sum of $I_m$ and $I_w$ and leads the flux F by an angle A. Thus the vector sum of $I_o$ with $I_p'$ gives the total primary current $I_p$, as shown, and the ratio of the transformer is then $$K_c = I_p/I_s \quad (4)$$

and its phase angle is B.

Referring to the geometry of the vector diagram of FIGURE 3, we find the following relationships:

$$I_p \cos B = K_t I_s + I_m \sin \phi_s + I_w \cos \phi_s \quad (5)$$
$$I_p \sin B = I_m \cos \phi_s - I_w \sin \phi_s \quad (6)$$

after simplifications we get the following formulas for $K_c$ and B:

$$K_c = K_t + \frac{I_m \sin \phi_s + I_w \cos \phi_s}{I_s} = K_t + \frac{I_o}{I_s} \sin(\phi_s + A) \quad (7)$$

$$\tan B = \frac{I_m \cos \phi_s - I_w \sin \phi_s}{K_t I_s} = \frac{I_o}{K_t I_s} \cos(\phi_s + A) \quad (8)$$

The above Equations 7 and 8, represent the usual uncompensated condition in practice with a positive phase-displacement of the total secondary load, thus the current ratio $K_c$ is greater than the turns-ratio $K_t$ and the phase angle B is positive.

From the above equations it will be seen that the values of $K_c$ and B are functions of $K_t$, $I_s$, $\phi_s$, $I_o$. We assume that $K_t$ is fixed by construction and the slider 13 is set initially to approximately compensate for the total voltage drop along the given secondary burden. Now any changes in the primary current $I_p$ may result in corresponding changes in the value of the secondary current $I_s$, which in turn, necessitates a corresponding change in the voltage induced in the secondary winding by the core flux. Thus, as the primary current is varied so also is the core-flux and with it the magnetizing component $I_m$ and iron-loss component $I_w$ of the exciting current $I_o$. These have, more particularly, an important influence upon the ratio and phase angle error in case of remote metering with unusual high secondary burdens and following secondary currents of relatively low intensity, and also because of the non-linear variability of the exciting current with changes above mentioned.

With undercompensation, any variation of the primary current $I_p$ will cause a non-linearly varying small flux to set up in the main core 3 produced by the resultant M.M.F. $E_x$ of Equation 2, and this flux is linked with the tertiary winding 14 connected to the voltage sensitive control means 15. The following resultant ampere turns is responsible for this flux and which is actually the exciting ampere-turns representing the error inducing a corresponding voltage to be applied on the control winding. This voltage exerts a proportionate displacement of the slider, which in turn supplies the corrective voltage $E_x$ until the flux reduces to zero in the main core 3.

Generally speaking, in order to obtain the full compensating secondary voltage under any variation of the burden or line-current, the resistance part of the compensating impedance $Z_1$ is always automatically adjusted to a value higher than the resistive burden of the secondary impedance $\underline{Z}$ as being required to provide compensation also for its own losses. Under any operating conditions, it is a function of many variables such as $I_s$, uncompensated exciting current $(I_o - I_{oc})$ and its components $I_m$ and $I_w$, to be expressed by the second term of Equation 7, as follows:

$$E_x = \frac{f(I_{m,uc} \sin \phi_s + I_{w,uc} \cos \phi_s)}{I_s} \quad (9)$$

where $I_{m,uc}$ and $I_{w,uc}$, respectively, are the uncompensated components of the exciting current $(I_o - I_{oc})$, as shown on vector diagram of FIGURE 3.

Thus it is quite evident that under given full compensation the Expression 9 reduces to zero and with it also the phase angle $b$ becomes zero according to Expression 8. Due to the fact that in this case the second term of Equation 7 is reduced to zero, the ratio of the transformer $K_c$ becomes equivalent with the ratio of the secondary to primary turns $K_t$. As a consequence, the secondary current vector $I_s$ will rotate to the exact phase-opposing position $I_{cs}$ shown with dotted lines.

FIGURE 4 illustrates the characteristical error curves under varying burden and secondary current. Curve 18 denotes the errors with normal burden $Z'=X+R_1$, whereas curve 19 denotes the exceedingly high errors caused by the greatly increased burden $Z=\sqrt{X^2+(R_1+R_2)^2}$ in remote-metering applications with long secondary wiring using relatively low secondary current rating. The automatically balanced operation with zero flux is represented by the dotted lined parallel curve 20, since under fully compensated condition the main transformer 1 works with neither ratio nor phase angle error.

(b) Overcompensated Case

If under given conditions and setting of the slider 13 the produced compensating voltage $E_{oc}$ is greater than required, the main current transformer 1 would then produce a reversed voltage $E_x$ with following positive ratio error and lagging phase error $-B$. This condition may be expressed by:

$$E_2 = E_{oc} - E_x \tag{10}$$

and shown on vector diagram of FIGURE 3. The corresponding error curve is denoted by reference numeral 21, and exciting current $I_{oc}'$.

This reversed operation is a necessary condition for maintaining the rated secondary current. Consequently, the unbalanced flux linked with the tertiary coil 14 will assume an opposite sign in providing the control voltage $-E_x$ which is then impressed upon the terminals of the control relay system 15. By virtue of this control voltage a proportionate displacement of the slider may take place in the opposite direction towards the position on the compensating impedance $Z_1$ to restore the desired equilibrium, when the flux reduces to zero and thereby also the control voltage becomes zero.

(c) Balanced Case

It may easily be derived the important conclusion that under any variable operating condition there exists always a definite position $Z_x$ on the compensating impedance $Z_1$ which must lie between the uncompensated value $Z_{uc}$ or overcompensated value $Z_{oc}$ respectively. The $Z_x$ represents the full compensating impedance as required to inject into the secondary circuit the full voltage to force the rated secondary current through the total burden. This relationship is expressed by the inequality:

$$Z_{uc} = Z_x = Z_{oc} \tag{11}$$

it is important to note that $Z_x$ is always greater than the given burden load $Z$ in order to produce a correspondingly increased voltage to compensate its own losses in accordance with the prevailing line-current and burden, and because of $E_x=0$, the value of $E_2=E_{oc}$.

Figure 5:
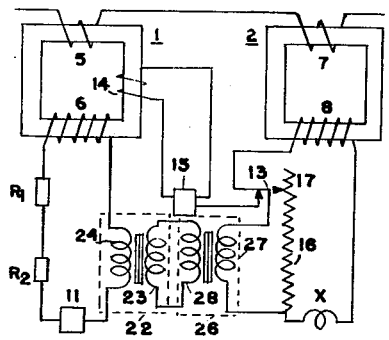
FIGURE 5 represents a modified embodiment of the principles of the invention using substantially two identical current transformers and the full compensating voltage is delivered to the secondary load circuit by means of additional voltage transformers of suitable turn ratio and characteristics.

FIGURE 5 represents a modified embodiment of the principles of the invention using substantially two identical current transformers with the same number of turn ratio. Like reference characters indicate similar parts in the different figures. The main characteristic feature consists in the delivery of the total volt-amperes to the burden of the main transformer by means of an auxiliary voltage-transformer 22 with primary and secondary windings 23 and 24, respectively, and having preferably a turn ratio of 1:1, the operation of which will be explained hereinafter.

The main current transformer 1 has the primary and secondary windings 5 and 6, respectively, while the auxiliary current transformer 2 has the primary and secondary windings 7 and 8, respectively. The instrument 11 and secondary extended wiring constitute the main burden in series with the secondary winding 6, and the impedance $Z_1$ of potentiometer type 17 is in series with the secondary winding 8. The automatic compensation is controlled by the tertiary winding 14 in a similar manner to that of FIGURE 1. An additional voltage-transformer 26 having its primary winding 27 connected across the compensating impedance $Z_1$, whereas its secondary winding 28 is connected in parallel with the primary winding 23 of said first auxiliary transformer 22. The secondary winding 24, however, is interposed in series with the main secondary circuit of transformer 1.

It is to be noted that the turn ratio of the auxiliary voltage-transformer 26 is selected to adapt its high voltage output to the required sensitiveness of the automatic compensation effected by the variable compensating impedance $Z_1$. Hence the entire secondary voltage is supplied by the auxiliary transformer 2 and is delivered to the main transformer 1 by means of two intermediate voltage transformers 22 and 26, respectively, which arrangement may otherwise eliminate any effect of mutual inductance that could possibly arise between the cooperating secondary windings of both current transformers.

Since the delivery of the compensating voltage is automatically controlled by the voltage on the tertiary winding 14, the operation of this modification is otherwise completely identical with that described in connection with FIGURE 1, and therefore the main transformer will operate with the highest accuracy. Thus no further details are given, and also the same type of curves as in FIGURE 4 and vector diagram as in FIGURE 3 apply to the explanation of the operation of this modified system.

Figure 6:
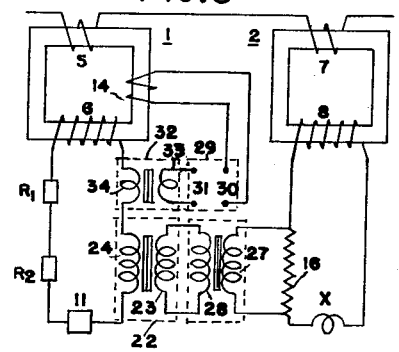
FIGURE 6 shows another modified arrangement where the relay control means controlling the automatic compensation is replaced by a magnetic amplifier means.

FIGURE 6 illustrates a modification of the embodiment shown in FIGURE 5 wherein only the fixed resistance portion 16 of the compensating impedance $Z_1$ is connected in series with the secondary winding 8 as required for delivering an approximate volt-amperes to the burden. The control relay means including the remaining potentiometer portion 17 is replaced by an amplifier means shown only as a block 29. This amplifier preferably may be an A.C. controlled external feedback type magnetic amplifier system as is well known to those skilled in the art and which is described in more detailed manner in connection with FIGURE 8. The input terminals 30 are connected to the tertiary control winding 14, while its output terminals 31 are connected to the primary winding 33 of an additional voltage transformer 32 of which the secondary winding 34 is in series-aiding relationship with the secondary winding 6 of the main transformer 1.

The maximum compensating voltage that the amplifier is delivering to the main secondary circuit is actually self-limited and it may be best understood by considering that it will operate as a degenerative system. The assumed external feedback produces an effectively infinite gain which is then highly degenerated in this arrangement by the reduction of the error control voltage at its input terminals 30 to substantially zero value when the approximate ampere-turn balance is restored. Under the expression "substantially to zero" may generally be understood that the unbalance of the ampere-turns may be reduced to a number of the order of one percent of the value which would exist without this compensating method.

The mentioned nearly zero control voltage is required to make the amplification possible with the practically indefinitely high amplificaion factor in order to operate it with self-balancing characteristics for providing the full compensating voltage. Thus, the windings of the voltage transformer 32 are arranged in the direction to add an additional compensating voltage in series with the burden of the main transformer 1.

The following FIGURES 7 to 11 illustrate various embodiments of this invention where the auxiliary control relay means generally designated at 15 is replaced by various arrangements for performing the desired compensating control.

For the sake of simplicity the complete current transformer system has not been shown in the following figures, but have only the terminals of the tertiary control winding 14 and compensating impedance $Z_1$ in FIGURE 1 been shown, together with details necessary for the understanding of the modified arrangements of the control relay means 15. It is thus presumed that the omitted current transformer circuits and other elements may be identical with those shown in FIGURE 1.

The modified embodiment shown on FIGURE 7 consists of the replacement of the control means 15 with a sensitive relay system of the electrodynamometer type generally indicated at 35. The potential coil 36 is connected to the available line voltage source 37, while its current coil 38 is connected to the error voltage output $E_x$ of the tertiary coil 14.

The resulting deflection is proportional to the product of current flowing through both coils and it takes place in the positive direction if the voltages are in phase in both coils. The relay means 35 carries a light rod pointer 39 which also constitutes the actual slider moving along the potentiometer balancing resistance 17.

When the ampere-turns on the core 3 of the main transformer 1 are unbalanced, the direction and extent of such unbalance is evidenced by the error voltage $E_x$ appearing on the coil 38 of relay 35 and operates it to actuate a deflection of pointer-slider 39 to restore the balance by the changed compensating voltage produced thereby. It is assumed that at undercompensation the error voltage is approximately synchronous or in phase with the A.C. voltage of the power source, consequently the produced displacement of the pointer is on the positive direction. While with overcompensation the error voltage $E_x$ is 180 degrees phase-displaced, which means that the direction of current flow is reversed through only one coil, therefore the direction of the deflection of the pointer will also reverse, and thereby to restore the balance. Thus this arrangement works like a phase sensitive detector.

It is actually immaterial whether the unbalance-ampere-turns and following error voltage on tertiary winding 14 occurs through a variation of secondary burden or line current. The error voltage, therefore, will be of phase dependent upon the direction of unbalance and will result in a compensating movement of the pointer-slider to attempt to correct the condition and to restore the zero flux condition on core 3 of the main transformer 1. Thus the departure of the actual value of the unbalance voltage from the desired zero value will result in a corrective change of the controlled agent in an attempt to return the departed variable of the ampere-turns to the desired level of complete balance.

The self-regulating slider control will practically instantly conform to variations of the error voltage, it may generally be stated that the unbalanced conditions of the ampere-turns which bring about the desired self-regulation are created primarily by the variable secondary burden. While under normal running condition the secondary burden will be kept substantially constant on any particular installation as there will be practically no change in the secondary leads, the unbalanced conditions as they occur from time to time being principally due to the changes of the magnitude of the line current affecting a steady variable unbalance caused by the non-linearity of the exciting current with respect to the changes in the magnitude of the secondary current.

A distinctive feature of this electrodynamometer type relay means is that at the reduction of the error voltage to approximately zero the pointer will not be brought back to its initial position by a spring action and rather it will remain stationary for a period until a change in the operating condition will again disturb the ampere-turn balance and will necessitate a new position of the pointer to restore again the balanced condition in changing correspondingly the value of the required compensating voltage. In this arrangement, likewise to a reversible motor operation, it is caused by a displacement of the pointer in one or the other direction in accordance with the sense of the error voltage actuating it.

While I have shown the error voltage $E_x$ as controlling the slider-pointer position through an electrodynamometer type of relay system, it is, of course, to be understood, that any suitable type of apparatus may be employed, the particular type illustrated being shown for the purpose of demonstrating a conventional type of indicating or deflecting type of system arrangement which has been found to be well suited for use in connection with the present invention.

FIGURE 8 is another modified embodiment of the auxiliary control means 15 represented by a thermal control unit indicated as a whole by the reference character 40 having a thermal responsive bimetallic element 41 for operating the slider and it is located in proximity to a resistance heater 42, the temperature of which is automatically controlled by the error voltage $E_x$ of the tertiary coil 14.

The thermal heater element 42 is what is known in the art and ordinarily employed in connection with temperature control systems. This unit further comprises a transformer generally designated at 43 having its primary winding 44 connected across the available power line by conductors 46 and is of the step down type having greater number of turns in the primary winding and the heater element 42 is in series with its secondary winding 45.

Thus it is seen that the heating resistor element 42 is energized by the secondary of the transformer 43 through a circuit including in series the load controlled windings 48, 49 of a magnetic amplifier generally indicated at 47, which is preferably selected to have an A.C. controlled external-feedback type circuit arrangement. This type of amplifier is especially suitable for applying the A.C. error voltage $E_x$ to its input circuit without incorporating a phase sensitive rectifier device.

It further comprises a series opposing connected control windings 50, 51, respectively and a sufficiently high resistance 52 is in series connected to minimize voltages induced into the control circuit by the fundamental wave of the supply voltage. The phase relationship between the control voltage $E_x$ and supply voltage may be adjusted so that the actual phase displacement becomes nearly 0 or 180°. The two feedback windings 53, 54 are interconnected with the load circuit in a conventional manner through a full-wave dry disc rectifier denoted at 55 and adjusting resistor 56. Since the synchronous variable control current $I_x$ is superimposed on the A.C. load current, they work additive and the actual value of the D.C. feedback ampere-turns becomes a function of $E_x$.

The selected magnetic amplifier system assumes an asymmetrical transfer characteristic having a bias provision, not shown here, in a conventional manner. Accordingly a positive control current $+I_x$, when the synchronous A.C. error voltage is in phase with the load A.C. voltage, causes an increase of the load current $I_L$, while a negative control current $-I_x$, when the error voltage is 180° phase-displaced, causes a decrease of $I_L$.

Evidently the actual magnitude of the heater or load current $I_L$ is determined by the combined effect of the heater resistor 42 and saturable reactor acting as a D.C. controlled inductive series impedance being a function of the control current $I_x$. Thus the above operating characteristic is applicable to good advantage because the heat developed in the heater element 42 controlling solely the movement of the bimetallic element 41 in either direction by the increase or decrease of the load current $I_L$.

Referring now again to FIGURE 8, the thermal responsive bimetallic element 41 is being fixed to a support 57 at one end, whereas its other free end is connected with the slider 13 through a link 58 so that the movement of the element 41 due to temperature changes will be transmitted to the slider. The element 41 and slider 13 are connected mechanically in such a manner that initially the half of the potentiometer resistor 17 is effective as series resistance of the compensating impedance $Z_1$ shown as whole between letters A, B, whereby various portions may be included for compensating the errors.

Generally speaking, the heating resistor and characteristics of the bimetallic element are designed so that the portion of the potentiometer resistor 17 introduced or removed from the circuit of the compensating impedance caused by the movement of the thermal responsive element upon changes of its temperature due to variations of the error voltage $E_x$, shall be able to restore the required balance under any variable conditions irrespective whether an increase or decrease of the voltage induced in the secondary of the auxiliary core 4 is desired for full compensation. The above thermal responsive element 41 is preferably located within an enclosure indicated at 59 so as to heat the interior thereof by means of the heating resistor 42 which should have a relatively low wattage capacity so that the heat generated by the flow of current therethrough will effect a highly sensitive responsiveness upon variation of the load current $I_L$ caused by changes of the error voltage $e_x$.

It is to be particularly noted that the above type of magnetic amplifier circuit is especially adaptable when utilized in conjunction with a continuously operating self-balancing system, in which deviations represented by the error voltage are self-correcting by the change of the compensating impedance.

It may be well appreciated that by virtue of the unsymmetrical transfer characteristic the system is adjusted, by means not shown here, that under balance a definite amount of output current is flowing and will increase by input of one polarity and decrease by input of reversed polarity. This operation is best understood by considering the function of a reversing motor operating a variable output device, such as a potentiometer with slider. According to such arrangements, by means of a control responsive device, whenever the control system departs from the normal zero error voltage condition, according to the sense of unbalance, the slider is caused to move in one direction or the other, as required to restore the full balance, which is identical to a so-called floating-action. Thus it is the characteristics of such method of operation that when the balance is restored, the variable output device definitely remains stationary for a certain period until such time as a further unbalance of ampere-turn occurs, and that the variable output device may come to rest at any position within its range of variability.

According to this floating characteristic of operation at a positive error voltage the output of the amplifier increases until it reaches an upper limit value restoring the ampere-turn balance with an almost zero control input voltage and thus it will remain at approximately the value at which the input becomes zero. If, on the other hand, a negative error voltage is imposed upon the input, the output will, in like manner, be decreased continuously as long as the negative input approaches again near zero value and, likewise, it will tend to remain at the value which may exist at this time-moment.

As a result, the amplifier in this connection will operate as a degenerated system in being superimposed by a negative feedback which provides a self-balancing potentiometer type of operating characteristic.

FIGURE 9 represents also another modified embodiment of the relay means 15 which differs mainly from that of FIGURE 8 in that the bimetallic element 41 is replaced by a bimetallic circularly arranged element 60 of conventional type having an arm 61 movable in either direction in response to temperature changes affecting the element. The arm forms also the slider contact for the potentiometer 17 which is in series with the fixed resistance portion 16. In the description of this embodiment reference is, therefore, made only to this thermostatic arrangement and associated elements therewith, and the remainder of the circuit is not described in detail, although like parts have been indicated by like reference characters. Obviously the element 60 will similarly move in either directions in accordance with the variable error voltage affecting the current flow in the heater resistor 42.

In each of the foregoing types of self-balancing compensating control devices certain moving parts are included and particularly represented by the self-balancing potentiometer type arrangements. In many instances, however, it may be desirable to avoid the use of units which embody moving parts and avoid difficulties and disadvantages which necessarily accompany such elements.

FIGURE 10 illustrates such a modified design of the relay means and associated thermal unit of FIGURE 8, in which a thermal responsive resistor 62 is substituted for said element 41, and which having preferably a positive temperature coefficient. Thus its resistance increases with rise in temperature and are of types well known in the art.

In this case the thermal responsive resistor 62 actually constitutes the variable potentiometer 17 of the compensating impedance $Z_1$. Obviously this element is also located adjacent to the heating resistor 42 to be responsive on changes in temperature as previously described in connection with FIGURE 8.

For the sake of simplicity, only the terminals A, B have been shown since the omitted parts of the circuit are identical with those described in the previous figures. The characteristic of the thermal responsive resistor may be selected so that under any possible variations in the operation and following variable error voltage affecting the current magnitude through the heater, its resistance value shall always change compensatorily to bring back the desired balanced condition with zero flux.

This type of circuit arrangement working in conjunction with the magnetic amplifier, may be regarded as a "voltage to resistance translator" providing a variation of the resistance as a function of the variable error voltage. Thus, for instance, with undercompensation the system causes to increase the heater current and its temperature, effecting an increase in the resistance of the thermal resistor for providing a rise of the induced voltage in the auxiliary core 4 to compensate the main transformer 1 by supplying the full ampere-turns as required for an operation with zero flux.

FIGURE 11 represents a particular embodiment wherein the potentiometer part 17 and slider are omitted and instead of the self-balancing effect is accomplished by the variation of the inductive impedance of the saturable core device of a magnetic amplifier of the type described in connection with FIGURE 8, and thus it is only shown as a block with some of its elements.

The potentiometer portion 17 of the compensating impedance $Z_1$ is shunted by the inductive impedance of the controlled windings 48, 49 of the magnetic amplifier system 47, in such a manner that said potentiometer 17 is actually replaced by a fixed resistor 63 and the resulting effective resistance of this parallel combination will vary accordingly to provide the desired full compensation.

It is important to note that in remote metering applications with relatively high secondary resistance the potentiometer portion of the matching compensating impedance $Z_1$ forms only a minor part of the whole resistance (including fixed resistance 16), the shunting reactance of the saturable reactor device may only slightly affect the phase angle of the induced compensating voltage and it may be neglected for practical purposes.

In this embodiment, therefore, the work of the relay control means 15 including the potentiometer and slider is actually replaced by the said magnetic amplifier which controls the compensating voltage in accordance with the variation of the error voltage impressed upon its input terminals.

As a result, the operation of the above self-balancing system is such that it will adjust itself automatically to supply the required compensating voltage to reduce the ampere-turn balance substantially to zero under any operating conditions.

FIGURE 12 illustrates, by way of example, the application of the principles of the invention in remote metering systems to be particularly used to great advantage in multistory buildings having provision for individually metering the kilowatt-hours..

One of the most common problems to be encountered on the above application lies in the fact that the required feeder wiring system of considerable length leading to the meters located in the basement greatly increase the cost of installation and also produce an appreciable voltage drop which in turn may require a further increase of the feeder capacity to compensate for this loss.

Accordingly, if the automatically compensated current transformer operating in accordance with the principles of the invention is applied for remote metering, the capacity of the conductors leading from current transformer to the remotely located may be reduced to a few percentage (preferably #20) of that used presently for supplying the current to the actual load.

In this figure the reference character 64 denotes the main alternating current feeder lines which are branched off by the 3 wire apartment feeders 65, 66, respectively, and illustrates the method of connecting the necessary novel current transformer and secondary wiring as required to operate the desired remote metering arrangement. It may readily be seen that one double-ratio current transformer generally indicated at 67 of the compensated type is used with the long secondary leads 71 connected to the current coil 68 of the metering equipment 70. For the sake of illustration two identical metering arrangements are shown being denoted by the like reference characters. It shall be noted that the potential coil 69 of the watthour meter 70 is to be connected by conductors 72 directly to the nearby located main feeders 64 in order to eliminate the long runs for the voltage connection usually taken off from the load point when the meter is also installed at the load.

More specifically stated, the great difficulty in designing a current transformer with 1 to 1.5 ampere secondary rating to be well-suited for remote metering with small capacity secondary conductors was the fact that current transformer errors exceedingly increase with increased secondary burden causing a very inaccurate reading under variable primary current and burden. Thus the automatic compensation method, as provided herein, will establish an accurate reading by supplying the voltage consumed in the long secondary wiring by means of an auxiliary transformer operating in accordance with the principles of the invention.

This remote metering arrangement further comprises a master meter generally indicated at 73 to be applied, if desirable, for local-totalization or indicating the total kilowatt-hour consumption of a group of individual meters connected by conductors 74 to the same main feeder 64 and thereby to check the accuracy of the individual meters in determining any eventual discrepancy that may exist between them. Such a deviation, if any may occur, between the added total reading of the individual meters and that of the master meter may be applied as final correction factor, or percentage registration to each individual meter.

It shall, however, be noted that the application of such a master meter is only tentative and it may be applied in special cases when the checking of the correct reading is specifically desired, although the accurate reading is secured by the method provided in this invention.

Reference numerals 75 and 76 denote protective devices serving the purpose of automatically interrupting the current supply through the current transformer in case of short circuit or opening of the secondary wiring leading to the remotely located meter, and thereby to prevent the usage of current when meter operation is interrupted for any reason whatsoever.

FIG. 12a shows in more detailed manner the use of the protective devices generally indicated at 75 and 76 of FIGURE 12. The method hereinafter described will provide means for preventing the fraudulent use of the electric energy from the watt-hour meter caused by any intentional or non-intentional functioning of the system supplying the control-pulses to be measured. The development of such protective measures are particularly important in remote metering arrangements where the users may also have the easy access to shunt the current around the current transformer by making a connection between the two adjacent terminals in short circuiting the current transformer, whereby the consumer may use electric energy without being measured.

The protective devices described hereinafter may also serve as safety measure against abnormal conditions. If the secondary circuit of a current transformer be opened while the primary current is carrying its normal current, the flux in the core will increase to several times the rated value by virtue of the large magnetizing ampere-turns to which the core is subjected. Actually under such opening of the secondary, the entire primary current becomes the exciting current which raises the core density to saturation and induces high voltage in the secondary.

The above overvoltage protection is the effect of a device 75 which operates on an abnormal increase of the voltage across the secondary of the main transformer 1 and causing the opening of the primary circuit. The action of this device is similar to that of an undervoltage protection known in the art, but with inverse operation. Accordingly, it comprises a coil 77 having a high resistance as not to affect the operation of the transformer and is connected parallel to the secondary of the main transformer 1. This coil actuates a set of holding contacts 78 located in series with the primary circuit and is adjusted to hold the contacts 78 closed under normal operating conditions and to open the primary circuit in case the voltage across the coil 77 raises above a certain predetermined limited value. When the normal condition has been restored, the closing of the contacts 78 can be effected by a manual start button 79 since a holding contact 80 in series with the coil 77 has also been opened. In order to automatically re-energize the coil, the holding contact 80 is eliminated.

In case of short circuit in the secondary leads near to the load point, however, the secondary terminals may be considered to be connected by a burden of negligible resistance, the current will have its largest value and the primary ampere-turns are almost annuled by the secondary ampere turns. The flux becomes negligibly small and the induced voltage across the secondary is just sufficient to circulate the secondary current through the impedance of the winding itself.

Another protective device indicated at 76 is connected across the secondary having a characteristic of undervoltage protection in a known manner. Due to the above explained voltage-dip the coil 81 actuating the same holding contacts cannot hold them closed and will interrupt the primary circuit. After return of the normal voltage, the restart may take place either manually or automatically as above explained.

Although only a few embodiments and methods of applicaton for remote metering of the present invention have been illustrated and described in detail, it is to be expressly understood that the invention is not limited thereto. Various changes in the design and arrangement of the parts can be made without departing from the spirit and scope of the invention as the same will now be understood by those skilled in the art, and, therefore, I aim in the appended claims to cover all such modifications and changes.

What I claim as new and desire to secure by Letters Patent of the United States is:

1. An electric remote metering system including a remotely located wattmeter for measuring alternating current energy comprising an alternating current transforming device of balanced ampere-turns including a main current transformer having a primary winding, a main secondary winding and a tertiary control winding, said wattmeter forming one part of the secondary load having its current coil connected to said main current transformer by relatively long leads constituting an additional part of the secondary load; an auxiliary current transformer having a primary winding, a principal secondary winding, an auxiliary secondary winding having in series a compensating impedance to form a closed compensating circuit inducing a compensating voltage into said principal secondary winding; a control relay means with movable means, the number of turns of said principal secondary winding of said auxiliary transformer being the same as that of its auxiliary secondary winding, the said primary windings being connected in series with each other and in the line in which a primary current to be measured is flowing, the said secondary winding of the main transformer and said secondary loads being connected in series aiding relationship with the principal secondary winding of said auxiliary transformer forming the main secondary load circuit, said compensating impedance having an inductance component initially selected to be substantially equal to the inductance of said wattmeter load and its resistance being of the potentiometer type having a slider for shunting any desired portion thereof, said compensating impedance being connected in series with said auxiliary secondary winding, said control relay means being controlled by the error potential on said tertiary winding to change the position of said movable means which are representative of said error, mechanical means connecting said slider to said movable means for applying thereto a displacement for setting the said potentiometer to a desired value, thereby to compensate said exciting ampere-turns by generating a compensating voltage to be introduced in series relationship into the main secondary circuit for delivering the full volt-amperes required by said load resistances under varying operating conditions to re-establish the ampere-turn balance in said main transformer and thereby to reduce the said exciting ampere-turns substantially to zero value.

2. An electric remote metering system as defined in claim 1 wherein the resistance component of the said compensating impedance is composed of a plurality of fixed individual resistors in series having said potentiometer portion in series, means provided to initially short circuit any number of said fixed resistors to operatively render effective a total series resistance to approximately match the resistance of the total secondary load including said secondary long leads, thereby to deliver an approximate compensating voltage as required by said total secondary load under given operating load current, whereby said variable potentiometer portion with its self-balancing arrangement serves merely to produce an additional corrective compensating voltage to provide a completion of the full compensating voltage required for the vectorial errors of said main current transformer under any variable operating conditions.

3. An electric metering system as defined in claim 2 wherein the current transforming device is connected to the current coil of said remotely located wattmeter and its potential coil is connected to the alternating current source located in proximity of said wattmeter, thereby to eliminate the relatively long wiring required by said potential coil of said wattmeter located at a relatively long distance from said current transforming device.

References Cited in the file of this patent

UNITED STATES PATENTS 2,428,613     Boyajian _____ Oct. 7, 1947